May 20, 1969  P. C. McLEOD, JR  3,444,879
FLUID PULSED OSCILLATOR
Filed June 9, 1967
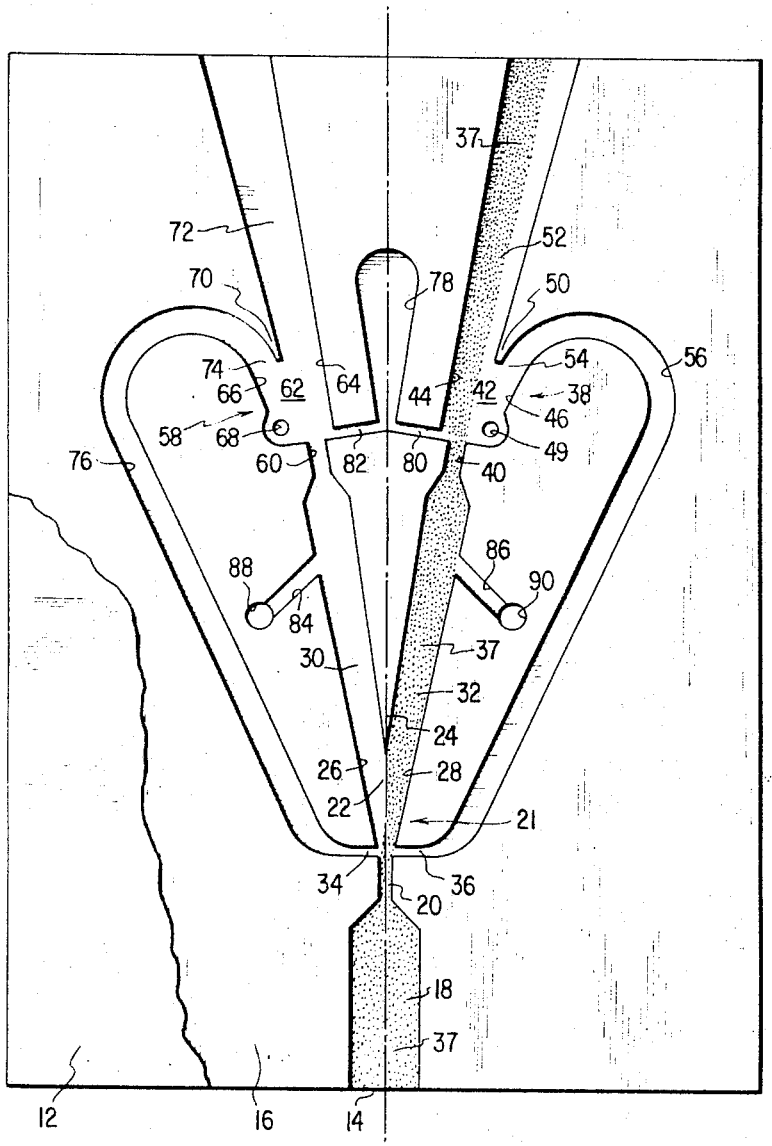
INVENTOR
PAUL C. McLEOD, JR.
BY
*Sughrue, Rothwell, Mion, Zinn & Macpeak*
ATTORNEYS.

United States Patent Office 3,444,879
Patented May 20, 1969

3,444,879
FLUID PULSED OSCILLATOR
Paul C. McLeod, Jr., Little Rock, Ark., assignor to Corning Glass Works, Corning, N.Y., a corporation of New York
Filed June 9, 1967, Ser. No. 645,035
Int. Cl. F15c 1/08
U.S. Cl. 137—81.5                                                      7 Claims

ABSTRACT OF THE DISCLOSURE

A fluid pulsed oscillator comprising a bistable fluid amplifier having a monostable device coupled to the downstream end of each fluid amplifier outlet passage, each monostable device having a nonstable outlet, a feed-back passage between each nonstable outlet and respective fluid control ports for said fluid amplifier and means for delivering fluid control pulses simultaneously to said monostable devices to cause the power stream to move momentarily into a nonstable outlet and thereby effect switching thereof from one fluid amplifier outlet passage to the other.

BACKGROUND OF THE INVENTION

Field of the invention

The present invention has general application to the fluidic field requiring a fluid pulsed oscillator and more particularly to systems requiring a simplified counter circuit which is fast acting and does not require a counterflow circuit nor supporting bistable elements to guarantee the direction in which the stream will switch on the next pulse.

Description of prior art

Pure fluid devices have recently come into vogue and have great application to sophisticated control systems and to computers generally, since the pure fluid devices are characterized by a total absence of moving parts. The devices employ a power stream or fluid which may be selectively switched into different outlet channels by other control fluid streams which interact with the power stream to be switched.

The control stream is of relatively low energy, in comparison to the power stream, such that an end device connected with the outlet channel may receive power far greater than that of the control stream. Pure fluid devices, of both monostable and bistable types, are quite common. In the bistable flip-flop, the power stream is deflected into one of two outlet channels by a temporarily applied control stream pulse, after which the power stream is maintained in the outer channel until a different control stream pulse subsequently switches it into the other outlet channel. The monostable devices are characterized by the provision of one outlet which normally receives the power stream and in which, in response to a control stream pulse, the power stream is momentarily deflected into the second outlet, whereupon, at cessation of the control stream pulse, the power stream immediately switches into the favored stable outlet. In addition to characterizing pure fluid devices in terms of monostable or bistable action, such devices are classified as momentum exchange devices or boundary layer devices. In a momentum exchange device, a control stream is directed against the side of the power stream and deflects the power stream away from the control stream. Thus, it is possible to selectively deflect the power stream into one or more target areas or outlet channels or outlet passages where the power stream may then perform a work function.

In the boundary layer control devices, the power stream is directed to a target area or outlet passage by the pressure distribution in the boundary layer region of the power stream. The pressure distribution is controlled by the wall configuration of the interaction chamber, the energy level of the power stream, the fluid transport characteristics, the backloading of the outlet passages and the flow of control fluid into the boundary layer region. The selective deflection of the power stream into a given outlet passage is controlled by introducing control fluid into the boundary layer of the power stream. As a result of the change in pressure distribution in the power stream and its boundary layer, the power stream is caused to switch to the other outlet passage. The configuration of the interaction chamber may be designed so that the power stream becomes locked to a given side wall and remains locked thereto, even though the flow of control fluid has been terminated.

Fluid pulsed oscillators which may or may not form a counter stage conventionally employ supporting bistable elements to guarantee the direction in which the power stream will switch and/or a counterflow circuit, which in itself requires considerable time to establish the necessary counterflow, to guarantee the direction in which the stream will switch on the next pulse. In an attempt to simplify such oscillators, the supporting bistable elements have been eliminated, but the presence of the counterflow circuits still require a considerable time to fully establish the necessary counterflow to ensure that the stream will switch in the desired direction upon the reception of the next control pulse.

SUMMARY OF THE INVENTION

The present invention is directed to a highly simplified, fluid pulsed oscillator which may act as a single pulse counter stage. The oscillator comprises a bistable fluid amplifier, preferably of the wall attachment type, including an inlet nozzle for selectively directing a power stream into one of two outlet passages, with the bistable amplifier including opposed control ports for controlling the same. Coupled to the downstream end of each fluid amplifier outlet passage is a monostable device including a first stable outlet, normally receiving the power stream, and a second nonstable outlet. A feed-back passage is coupled respectively between each nonstable outlet and one of the opposed control ports for the fluid amplifier. Means are provided for simultaneously delivering a fluid control pulse to each monostable device to cause the power stream to momentarily move from the first monostable device outlet to the second nonstable device outlet and to thereby effect switching of the power stream from one bistable fluid amplifier outlet passage to the other. For long pulse operation, delay circuits may be built into the feedback passages. The monostable devices may also be of the wall attachment type. The means for delivering the fluid control pulse simultaneously to both monostable device may comprise a central control pulse inlet nozzle acting to commonly supply the fluid pulse to diverging control ports at the inlet end of the monostable devices. To ensure passage of the power stream into the first outlet of each monostable device, the interaction chamber, on the side opposite that coupled to the first outlet, monostable device, may be vented to atmosphere.

A BRIEF DESCRIPTION OF THE DRAWING

The single figure is a plan view, partially in section, of a preferred embodiment of the fluid pulsed oscillator of the present invention.

DESCRIPTION OF THE PREFERRED EMBODIMENT

The simplified fluid pulsed oscillator of the present invention is shown in the drawing. The construction of fluid oscillator 10, which may preferably form a single pulse counter stage, is quite conventional. Fluid devices, in general, consist of a laminar structure involving outer sheets 12 and 14 acting to sandwich a configured intermediate sheet 16. The laminates 12, 14 and 16 may be formed of metallic, plastic, glass, ceramics and glass ceramics or like material, with the outer sheets 12 and 14 being securely attached, in sealing relation, to the intermediate sheet 16 by suitable means, such as adhesive. The sheets 12, 14 and 16 may be formed with suitable passages or apertures. If passages and internal apertures are formed in the outer sheets 12 and 16, they must be formed to a depth less than the sheet thickness, since these sheets are also covers for the device. The sheets 12, 14 and 16 are preferably bonded together by fusion. In the embodiment shown, the intermediate sheet 16 contains channels, passages, openings and the like. The relieved or cut-out portion of the intermediate sheet may be achieved by stamping, etching or any other conventional process.

In the structure shown, the intermediate sheet 16 has been cut away to form a fluid inlet line 18 terminating in inlet nozzle 20 at the upstream end of a wall attachment pure fluid amplifier 21 including an interaction chamber 22. A tapered splitter member 24 acts in conjunction with diverging chamber walls 26 and 28 to form a pair of diverging amplifier outlet passages 30 and 32, respectively, at the downstream end of interaction chamber 22. It is noted that the cross-sectional area of either outlet passage 30 or 32 is much greater than the cross-sectional area of the inlet nozzle 20. A pair of opposed control ports 34 and 36 are positioned normal to the axis of the interaction chamber 22 adjacent the inlet nozzle 20. A source of fluid pressure (not shown), which is coupled to fluid inlet 18, causes a fluid power stream 37 to enter chamber 22 from inlet port 20 where it passes downstream, toward the splitter 24. Chamber asymmetry will cause the power stream to enter either one or the other of the fluid outlet passages 30 or 32 by attaching itself to either side wall 26 or 28 (assuming that the device is of the wall attachment type). A further assumption will be made that, in the absence of a control signal, the power stream will normally attach itself to the right-hand wall 28, and will move into outlet passage 32. At the end of the outlet passage or channel 32, there is a restriction forming a second nozzle 40 which acts as a load and forms a part of a series-coupled monostable fluid device 38. The monostable fluid device 38 employs nozzle 40 for directing pressurized fluid into chamber 42 where the fluid, in the absence of a control signal, will attach itself to chamber side wall 44, since the opposite wall 46 is both further away and vented to the atmosphere through vent opening 48 carried by sheet 14. At the downstream end of chamber 42, the side wall 44 acts in conjunction with a second tapered splitter member 50 to form a first monostable device outlet passage 52. The splitter 50 acts further, in conjunction with the remote right-hand side wall 46, to form at the downstream end of chamber 42, a second nonstable outlet passage 54. A feedback channel or passage 56 connects the nonstable outlet passage 54 to the right-hand control port 36 of the wall attachment fluid amplifier 21.

In like manner, at the downstream end of the wall attachment fluid amplifier outlet passage 30, there is provided a second series-coupled monostable fluid device 58, including a nozzle 60, and an interaction chamber 62 formed by opposed side walls 64 and 66. The pressurized fluid emitted from nozzle 60 tends to attach itself to side wall 64, since the opposite side wall 66 is both further away and vented to the atmosphere in the same manner as side wall 46 through vent passage 68. Splitter 70 acts in conjunction with side wall 64 to form a first stable outlet passage 72 and in conjunction with side wall 66, forms a nonstable outlet passage 74. Again, a curved feedback channel 76 acts to fluid connect the nonstable outlet passage 74 of monostable device 58 to the left-hand control port 34 of wall attachment fluid amplifier 21.

The fluid pulsed oscillator is appropriately controlled from a single source of fluid pulses (not shown) which is coupled to a centrally located control pulse inlet passage 78. The fluid pulsed inlet passage 78 opens up at its downstream end into a pair of oppositely directed control ports 80 and 82 which are fluid coupled respectively to monostable fluid devices 38 and 58. In this respect, the right-hand control port 80 opens up into monostable interaction chamber 42 near the area of fluid discharge into the chamber from nozzle 40. In like manner, the left-hand fluid control port 82 opens into monostable interaction chamber 62, adjacent nozzle 60.

In the form shown, additional vent means in the form of passages 84 and 86 and vent ports 88 and 90 are provided for fluid outlet passages 30 and 32, respectively. Thus, if there is a tendency, as a result of the presence of the restrictor nozzles 40 and 60, for the power stream to back up within the wall attachment fluid amplifier outlet passages 30 and 32, the presence of the vent means will prevent the pressure back-up from tending to prematurely flip the power stream from one outlet passage to the other as a result of outlet passage overload.

In operation, the assumption is made that the delivery of the pressurized fluid to the power stream inlet 18 has resulted in fluid passing through the right-hand outlet passage 32 of the wall attachment fluid amplifier 21, and the stable outlet passage 52 of monostable element 38. The momentary application of a fluid pulse at control inlet 78 will result in half of the fluid pulse traveling away from the power stream or power jet 37 through control port 82 to cause no action since there is no power stream flow through the left-hand portion of the oscillator. However, that half of the input pulse that travels through the right-hand control port 80 will cause the power stream to leave the left-hand wall 44 and the stable fluid outlet passage 52 and enter the nonstable fluid outlet passage 54. Since fluid outlet passage 54 is coupled directly to the right-hand control port 36 of the wall attachment fluid amplifier 21, the fluid passing into feedback channel 56 will form a control signal which is immediately applied to the base of the power stream at its point of entry into interaction chamber 22 of amplifier 21, causing the power stream 37 to switch from outlet passage 32 to the opposite outlet passage 30 where it will then attach to wall 26 setting up the same conditions previously described.

Upon receipt of the next fluid pulse within pulse control passage 78, since the power stream 26 no longer passes through wall attachment fluid amplifier outlet passage 32 and monostable device outlet passage 52, the presence of a control pulse fluid in control port 80 will have no effect on oscillator operation. However, the other half of the control pulse which passes to the left through control port 82 will cause the power stream 37, which has now attached itself to wall 64 within monostable outlet passage 72, to move to the nonstable outlet passage 74. In the feedback passage 76, a control signal is created, which is received at control port 34 to cause upstream switching of the power stream 36 back into fluid amplifier outlet passage 32.

It is obvious that the fluid pulse emanating from control pulse inlet 78 must not exceed the sum of the feedback time and the switching time of the bistable oscillator, since if this were true, the presence of pressurized fluid in control port 82 would effect an immediate reverse switching of the power stream from wall attachment outlet passage 30 back to outlet passage 32. However, for long pulse operation, delay circuits in the form of series restrictors or capacitors could be brought into the feedback loop for passages 56 and 7 to ensure proper bistable operation for movement of the power stream in either direction.

The fluidic device has been described in general terms as a fluid pulsed oscillator. It is obvious that the device may be used as a counter, counting the pulses as represented by control stream pulses issuing from control passage 78. For each control pulse, the power stream 37 switches from one state to the other, its output appearing at either monostable outlet 52 or 72 and representing a count. The device is capable of very rapid counting, since the counter need not be reset before being able to receive a subsequent count pulse, nor does the counter require a counterflow circuit which inherently requires considerable time to establish the necessary counterflow to guarantee the direction in which the stream will switch on the next pulse. The power stream will remain deviated or switched toward either wall attachment fluid amplifier outlet passages 30 or 32 and therefore, monostable device outlet passages 72 or 52 into which it was last directed by the control stream, even after the control pulse is ended. Since the energy contained in the control stream, within control passage 78, may be of a lower level than that of the power stream 37, the fluid pulsed oscillator may be readily called a fluid amplifier. The present device is particularly designed for use in simplified circuits or possibly miniaturized counter circuits, although the device has more general application as that of a pulsed oscillator. For this latter application, a long duration pulse may be applied at control passage 78, in which case the system would then oscillate for the duration of the pulse at a frequency dependent upon the internal characteristics of the device. In this form, the fluid pulsed oscillator has great value in such applications as tone burst generation and clock circuitry. The presence of the bleed or vent passages 84 and 86 and ports 88 and 90 is primarily to prevent the presence of the restrictor nozzles 40 and 60 from interfering with the correct oscillator operation in response to the reception of fluid control pulses within control passage 78. They do not modify the frequency and sensitivity of the oscillator. The power stream 37 and the fluid control pulses may be formed of a compressible fluid, such as air, nitrogen or other gas, or incompressible fluids, such as water or other liquids. Both the compressible and incompressible fluids may contain solid material.

What is claimed is:

1. A fluid pulsed oscillator comprising: a bistable fluid amplifier including; an inlet nozzle for selectively directing a power stream into one of two outlet passages and opposed amplifier control ports on opposite sides of said inlet nozzle; a monostable device fluid coupled to the downstream end of each fluid amplifier outlet passage, each monostable device including a nonstable outlet and a feedback passage coupling said nonstable outlet to its respective fluid amplifier control port, and means for delivering a fluid control pulse simultaneously to each monostable device to cause the power stream with one monostable device to momentarily switch to its nonstable outlet and thereby effect switching thereof from one fluid amplifier outlet passage to the other.

2. The oscillator as claimed in claim 1 wherein said bistable fluid amplifier is of the wall attachment type and comprises; an interaction chamber including opposed walls and splitter means at the downstream end thereof and forming with said amplifier walls, opposed, diverging fluid amplifier outlet passages.

3. The oscillator as claimed in claim 2 further including vent means for each fluid amplifier outlet passage intermediate of said splitter and said monostable device.

4. The oscillator as claimed in claim 1 wherein each monostable device is of the wall attachment type and comprises; an interaction chamber including opposed walls, a nozzle at the upstream end thereof and coupled to the downstream end of its respective fluid amplifier outlet passage, a splitter at the downstream end of said interaction chamber, and forming with one wall of said interaction chamber, a first stable outlet.

5. The oscillator as claimed in claim 4 wherein said second wall of said monostable device interaction chamber is spaced laterally from the axis of its nozzle to a greater extent than said first wall and to form therewith said nonstable outlet.

6. The oscillator as claimed in claim 4 further including vent means carried by said monostable device interaction chamber adjacent said second wall to ensure power stream attachment to said first wall.

7. The oscillator as claimed in claim 4 further including a common fluid control pulse passage positioned intermediate of said diverging first and second fluid outlet passages, and oppositely directed control ports, each port having one end fluid coupled to respective monostable device interaction chambers, adjacent the inlet nozzle and having the other end connected to said common fluid control pulse passage.

References Cited

UNITED STATES PATENTS

| | | | |
|---|---|---|---|
| 3,117,593 | 1/1964 | Sowers | 137—81.5 XR |
| 3,180,575 | 4/1965 | Warren | 235—201 |
| 3,219,271 | 11/1965 | Bauer | 235—201 |
| 3,226,023 | 12/1965 | Horton | 235—201 |
| 3,232,305 | 2/1966 | Groeber | 137—81.5 |
| 3,331,381 | 7/1967 | Quigley | 137—81.5 |

SAMUEL SCOTT, *Primary Examiner.*